United States Patent
Ishikawa (10) Patent No.: US 9,825,577 B2
(45) Date of Patent: Nov. 21, 2017

(54) DRIVE CONTROL DEVICE OF A BRUSHLESS DC MOTOR

(71) Applicant: NIDEC SERVO CORPORATION, Kiryu-shi, Gunma (JP)

(72) Inventor: Masatomo Ishikawa, Kiryu (JP)

(73) Assignee: NIDEC SERVO CORPORATION, Gunma (JP)

(*) Notice: Subject to any disclaimer, the term of this patent is extended or adjusted under 35 U.S.C. 154(b) by 0 days.

(21) Appl. No.: 15/014,228

(22) Filed: Feb. 3, 2016

(65) Prior Publication Data

US 2016/0233815 A1 Aug. 11, 2016

(30) Foreign Application Priority Data

Feb. 9, 2015 (JP) ................................. 2015-022864

(51) Int. Cl.
*H02P 6/06* (2006.01)
*H02P 29/024* (2016.01)
*H02P 6/182* (2016.01)

(52) U.S. Cl.
CPC ............ *H02P 29/027* (2013.01); *H02P 6/182* (2013.01)

(58) Field of Classification Search
CPC ............. H02P 29/07; H02P 6/182; H02P 6/28
USPC .................................................... 318/400.03
See application file for complete search history.

(56) References Cited

U.S. PATENT DOCUMENTS

| 2011/0117577 A1* | 5/2011 | Reboud | B01L 3/502761 |
| | | | 435/7.23 |
| 2012/0194114 A1* | 8/2012 | Ito | H02P 7/285 |
| | | | 318/434 |
| 2014/0159627 A1* | 6/2014 | Lee | H02P 29/027 |
| | | | 318/400.22 |
| 2015/0115852 A1* | 4/2015 | Lee | H02H 7/09 |
| | | | 318/400.22 |

FOREIGN PATENT DOCUMENTS

JP 2013-137201 A 7/2013

* cited by examiner

*Primary Examiner* — Erick Glass
(74) *Attorney, Agent, or Firm* — Keating & Bennett, LLP (57) ABSTRACT

A drive control device of a motor includes a comparison unit for comparing a first voltage value, which increases or decreases depending on a current value obtained in an inverter unit of the motor, with a reference voltage value, and an arithmetic processing unit for determining presence or absence of an overcurrent based on a comparison result of the comparison unit. The arithmetic processing unit includes a first terminal and a second terminal. The comparison result of the comparison unit is inputted to the first terminal. The second terminal receives the input of the first voltage value and outputs an operation confirmation signal to the comparison unit at predetermined timings. The arithmetic processing unit determines an overcurrent state based on the first voltage value and determines a state of the first terminal based on an output timing of the operation confirmation signal from the second terminal.

7 Claims, 5 Drawing Sheets

DRIVE CONTROL DEVICE OF A BRUSHLESS DC MOTOR

BACKGROUND OF THE INVENTION

1. Field of the Invention

The present disclosure relates to a drive control device of a brushless DC motor.

2. Description of the Related Art

In the related art, there is known a drive control device for driving a brushless DC motor, which has function of stopping the motor for a safety purpose when an overcurrent is generated within the motor. The drive control device includes a current detection circuit arranged to detect a current value of a current flowing within the motor.

In the drive control device of the brushless DC motor, the current value detected by the current detection circuit is monitored by a microcomputer. Thus, when an overcurrent is generated within the motor, it is possible to take a measure of stopping the motor or other measures. In addition to the microcomputer, it is thinkable to provide a comparison circuit which compares the current value detected by the current detection circuit with a predetermined threshold value. If the comparison circuit is provided outside the microcomputer, it is possible to reduce the load borne by the microcomputer.

However, when an abnormality such as a short-circuit, an earth fault or an open state is generated in the comparison circuit, there is a possibility that it becomes impossible to detect the presence or absence of an overcurrent. For that reason, it is preferable to periodically self-diagnose whether the comparison circuit is normally operated.

There is a demand for a drive control device of a motor that can enjoy high stability while reducing the number of used terminals of a microcomputer.

SUMMARY OF THE INVENTION

According to one aspect of the present disclosure, there is provided a drive control device of a brushless DC motor. The drive control device includes a control circuit which includes a comparison unit configured to compare a first voltage value with a reference voltage value and an arithmetic processing unit configured to determine presence or absence of an overcurrent based on a comparison result of the comparison unit. The first voltage value increases or decreases depending on a current value obtained in an inverter unit for driving the brushless DC motor. The arithmetic processing unit includes a first terminal to which the comparison result of the comparison unit is inputted, an overcurrent detection processing unit configured to determine an overcurrent state and stop the drive of the brushless DC motor if the first voltage value exceeds the reference voltage value in the comparison result, a second terminal configured to receive the input of the first voltage value and repeatedly output an operation confirmation signal to the comparison unit at predetermined timings, and an operation confirmation processing unit configured to determine a state of the first terminal based on an output timing of the operation confirmation signal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An exemplary preferred embodiment of the present disclosure will now be described with reference to the accompanying drawings.

1. Configuration of Drive Control Device

Figure 1:
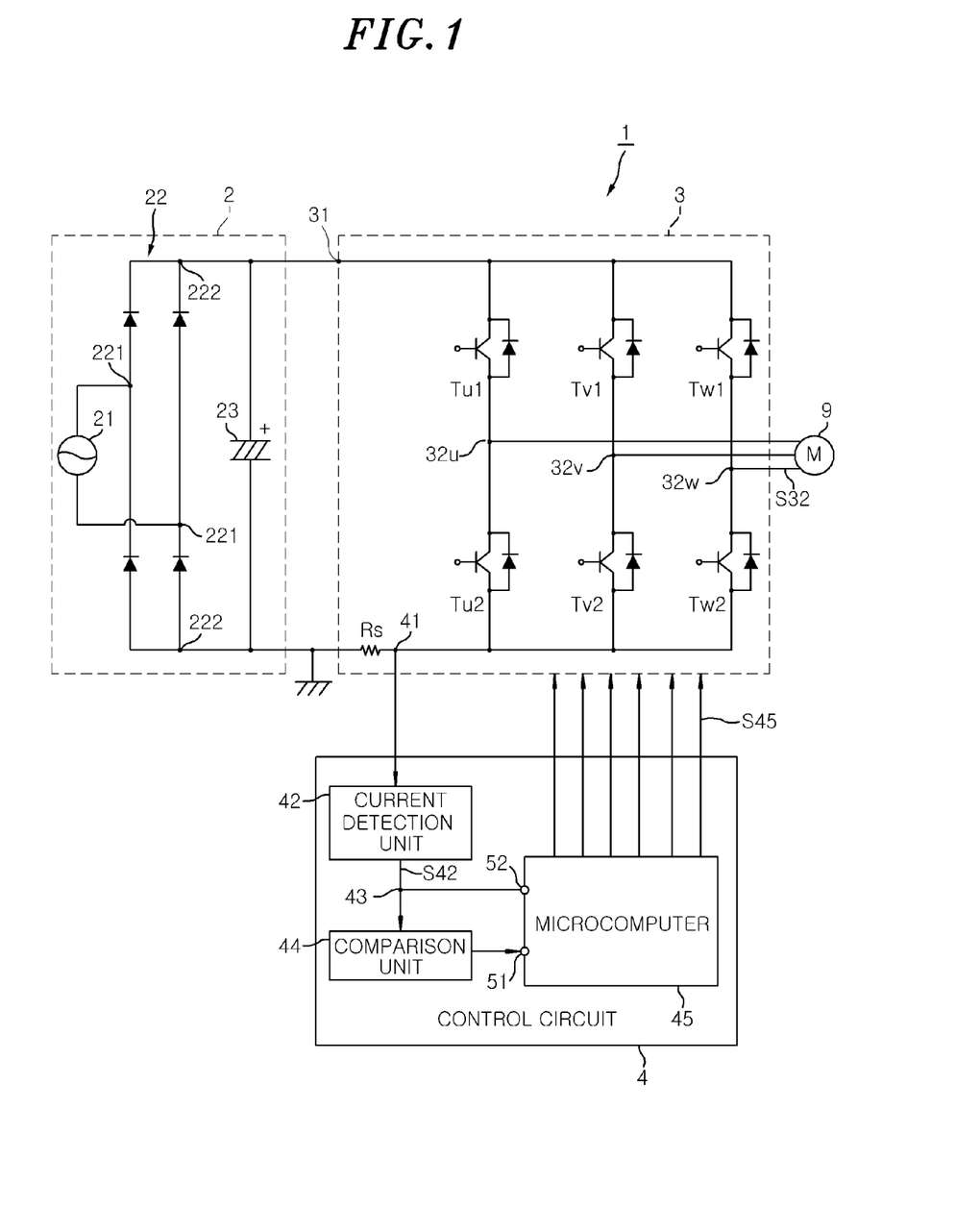
FIG. 1 is a view illustrating the configuration of a drive control device according to a preferred embodiment.

First, the configuration of a drive control device will be described with reference to FIG. 1. FIG. 1 is a view illustrating the configuration of a drive control device 1 according to one preferred embodiment of the present disclosure. The drive control device 1 is a device which controls the drive of a motor 9 by supplying a drive current S32 to the motor 9. The drive control device 1 is used to control a motor 9 which operates, for example, a blower of a bathroom dryer. However, the motor to be controlled by the drive control device of the present disclosure may be a motor mounted to a product other than the bathroom dryer.

In the preferred embodiment, a three-phase brushless DC motor is used as the motor 9. The motor 9 preferably includes stator coils of respective phases, namely a U-phase, a V-phase and a W-phase. If a drive current is supplied to the stator coils of the respective phases, a torque is generated between a stator and a rotor. Thus, the rotor is rotationally driven. However, the motor to be controlled by the drive control device according to the present disclosure may be any motor that uses an inverter, such as a single-phase motor or a brush motor.

As illustrated in FIG. 1, the drive control device 1 preferably include a power supply unit 2, an inverter unit 3 and a control circuit 4.

The power supply unit 2 preferably includes an AC power source 21, a diode bridge 22 and a smoothing capacitor 23. An external power supply device may be used as the AC power source 21. The diode bridge 22 is a full-wave rectifier circuit having four diodes. The AC power source 21 is arranged to input an AC voltage to between two input terminals 221 of the diode bridge 22. Then, the AC voltage thus inputted is full-wave rectified in the diode bridge 22. A full-wave rectified voltage having a voltage waveform of only a positive voltage is outputted to between two output terminals 222 of the diode bridge 22.

The smoothing capacitor 23 is arranged to smooth the full-wave rectified voltage full-wave rectified in the diode bridge 22, thereby converting the full-wave rectified voltage to a DC voltage Vbus. Thus, the DC voltage Vbus is supplied to a voltage input terminal 31 of the inverter unit 3.

The inverter unit 3 is arranged to supply a drive current S32 to the motor 9 in response to a pulse signal S45 inputted from the control circuit 4. The inverter unit 3 preferably includes a voltage input terminal 31, six switching elements Tu1, Tu2, Tv1, Tv2, Tw1 and Tw2, a shunt resistor Rs, and three motor connection terminals 32u, 32v and 32w. Each of the switching elements Tu1, Tu2, Tv1, Tv2, Tw1 and Tw2 is formed of a transistor and a diode which are connected in parallel. For example, an IGBT (Insulated Gate Bipolar Transistor) is used as the transistor.

Two switching elements Tu1 and Tu2 of the six switching elements Tu1, Tu2, Tv1, Tv2, Tw1 and Tw2 are serially connected between the voltage input terminal 31 and the shunt resistor Rs. Furthermore, another two switching elements Tv1 and Tv2 are serially connected between the voltage input terminal 31 and the shunt resistor Rs. Moreover, the remaining two switching elements Tw1 and Tw2 are serially connected between the voltage input terminal 31 and the shunt resistor Rs. The two switching elements Tu1 and Tu2, the two switching elements Tv1 and Tv2, and the two switching elements Tw1 and Tw2 are parallel-connected to one another.

The shunt resistor Rs is connected at one end to the switching elements Tu2, Tv2 at one end thereof and Tw2 and is grounded at the other end. When driving the motor 9, a bus current Ibus flows from the inverter unit 3 to the shunt resistor Rs. A motor connection terminal 32u is positioned between the two serially-connected switching elements Tu1 and Tu2. A motor connection terminal 32v is positioned between the two serially-connected switching elements Tv1 and Tv2. A motor connection terminal 32w is positioned between the two serially-connected switching elements Tw1 and Tw2.

When driving the motor 9, with respect to the respective phases, namely the U-phase, the V-phase and the W-phase, a pair of pulse signals S45 is inputted to a pair of switching elements Tu1 and Tu2, a pair of switching elements Tv1 and Tv2 and a pair of switching elements Tw1 and Tw2. Thus, the on/off states of the respective switching elements Tu1, Tu2, Tv1, Tv2, Tw1 and Tw2 are switched and the drive current S32 is outputted from the motor connection terminals 32u, 32v and 32w to the respective phases, namely the U-phase, the V-phase and the W-phase, of the motor 9.

Figure 2:
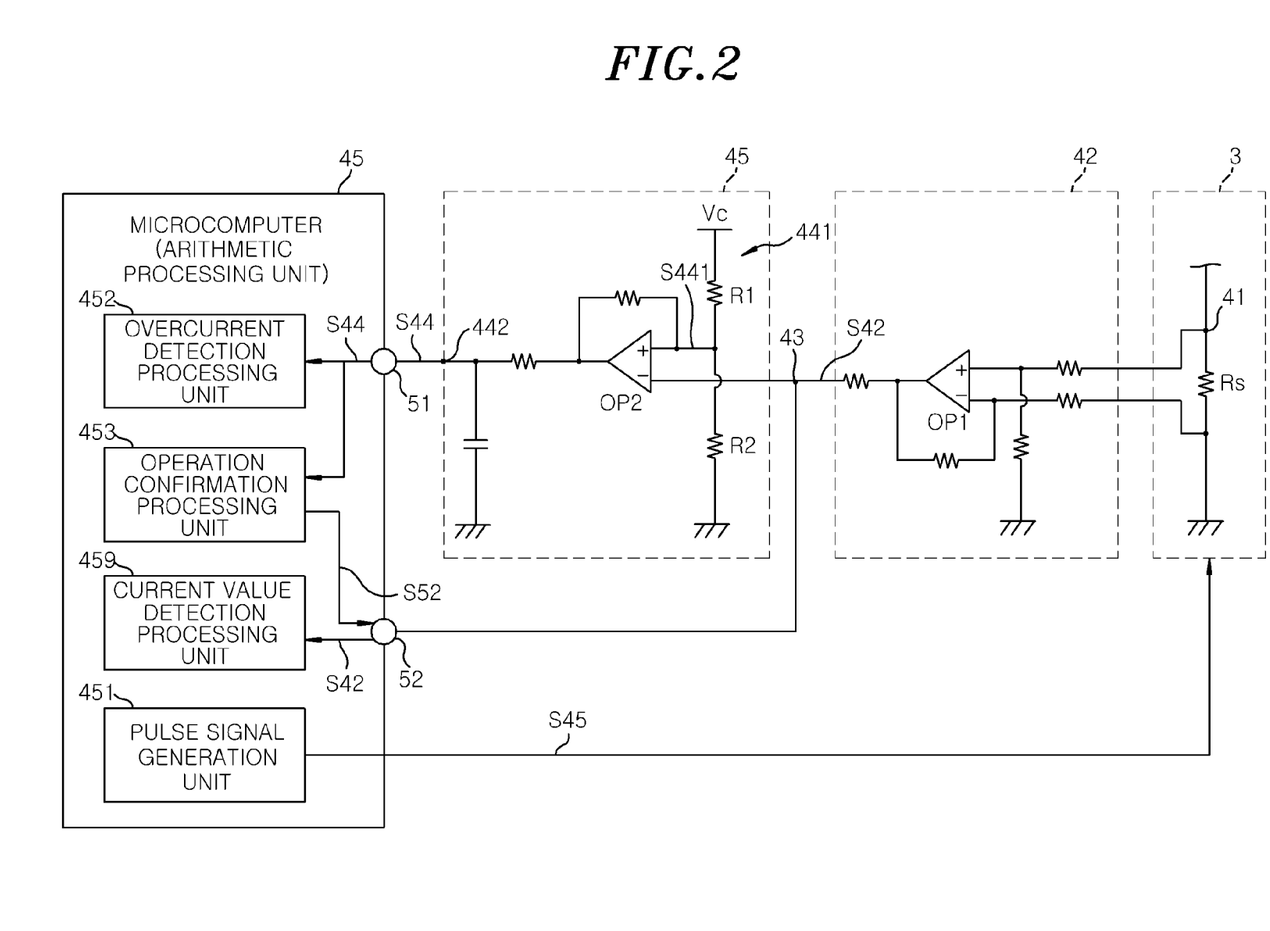
FIG. 2 is a view illustrating the configuration of a control circuit in more detail than FIG. 1.

The control circuit 4 is a circuit for controlling the inverter unit 3 while monitoring the bus current Ibus of the motor 9. FIG. 2 is a view illustrating the configuration of the control circuit 4 in more detail than FIG. 1. As illustrated in FIGS. 1 and 2, the control circuit 4 preferably includes a shunt voltage terminal 41, a current detection unit 42, a comparison unit input terminal 43, a comparison unit 44 and a microcomputer 45.

The shunt voltage terminal 41 is connected between the three switching elements Tu2, Tv2 and Tw2 of the inverter unit 3 and the shunt resistor Rs. If the bus current Ibus flows through the shunt resistor Rs, the voltage value of the shunt voltage terminal 41 becomes a shunt voltage Vs which increases or decreases depending on the current value of the bus current Ibus.

The current detection unit 42 is an amplifier circuit which amplifies the shunt voltage Vs inputted to the shunt voltage terminal 41. As illustrated in FIG. 2, in the preferred embodiment, the current detection unit 42 is a differential amplifier circuit which includes an operational amplifier OP1 as an amplifier and a plurality of resistors. A non-inverting input terminal of the operational amplifier OP1 is connected to the shunt voltage terminal 41 via a resistor. An inverting input terminal of the operational amplifier OP1 is grounded via a resistor. Thus, a first voltage value S42 proportional to a voltage difference between the shunt voltage Vs and the ground voltage is outputted to an output terminal of the current detection unit 42.

The comparison unit input terminal 43 serves as an output terminal of the current detection unit 42 and an input terminal of the comparison unit 44. The first voltage value S42 outputted from the current detection unit 42 is inputted to the comparison unit 44 via the comparison unit input terminal 43.

The comparison unit 44 is a comparison circuit which includes an operational amplifier OP2. The comparison unit 44 preferably includes a voltage-dividing circuit 441 which inputs a predetermined reference voltage value S441 to a non-inverting input terminal of the operational amplifier OP2. The voltage-dividing circuit 441 preferably includes a constant-voltage source Vd and two resistors R1 and R2. The two resistors R1 and R2 are serially connected to each other in between the constant-voltage source Vd and the ground point. The non-inverting input terminal of the operational amplifier OP2 is connected to between the two resistors R1 and R2. Thus, the voltage supplied from the constant-voltage source Vd is divided according to a resistance ratio of the resistor R1 to the resistor R2 and is then inputted to the non-inverting input terminal of the operational amplifier OP2 as a reference voltage value S441 kept constant.

On the other hand, an inverting terminal of the operational amplifier OP2 is connected to the comparison unit input terminal 43. Therefore, when the first voltage value S42 of the current detection unit 42 is inputted to the comparison unit input terminal 43, the operational amplifier OP2 compares the reference voltage value S441 with the first voltage value S42. The operational amplifier OP2 outputs a voltage value, which depends on the magnitude relationship of the two input voltage values, from the output terminal thereof.

An output terminal 442 of the comparison unit 44 is connected to a below-described first terminal 51 of the microcomputer 45. Thus, a determination voltage S44 indicative of the comparison result of the comparison unit 44 is inputted to the first terminal 51. Specifically, if the first voltage value S42 is smaller than the reference voltage value S441, the determination voltage S44 becomes a H (high) level. If the first voltage value S42 is equal to or larger than the reference voltage value S441, the determination voltage S44 becomes an L (low) level which is lower than the H level.

The microcomputer 45 is an arithmetic processing unit (microcontroller) which controls the operations of the six switching elements Tu1, Tu2, Tv1, Tv2, Tw1 and Tw2 of the inverter unit 3. The microcomputer 45 outputs pulse signals S45 to the inverter unit 3, based on the motor drive command signal inputted from the outside, the determination voltage S44 inputted from the first terminal 51 and the first voltage value S42 inputted from the second terminal 52.

The pulse signals S45 are three pairs of PWM signals, i.e., six PWM signals in total, corresponding to the respective phases, namely the U-phase, the V-phase and the W-phase, of the motor 9. The pulse signals S45 outputted from the microcomputer 45 are respectively inputted to the six switching elements Tu1, Tu2, Tv1, Tv2, Tw1 and Tw2.

The microcomputer 45 preferably includes a first terminal 51 and a second terminal 52. The first terminal 51 is a digital port. The second terminal 52 is a digital/analog port. The first terminal 51 is a terminal to which at least a signal coming from the outside can be inputted. The determination voltage S44 coming from the comparison unit 44 is inputted to the first terminal S1. The second terminal 52 is a terminal to which a signal coming from the outside can be inputted and from which a signal can be outputted to the outside. That is to say, the microcomputer 45 is capable of setting the second terminal 52 as an analog input terminal or setting the second terminal 52 as a digital output terminal.

The second terminal 52 periodically outputs an operation confirmation signal S52 to the comparison unit input terminal 43 at predetermined timings. Thus, the operation confirmation signal S52 is inputted to the comparison unit 44. Except when the operation confirmation signal S52 is outputted, the first voltage value S42 coming from the current detection unit 42 is inputted to the second terminal 52 as an analog quantity. That is to say, the second terminal 52 receives the input of the first voltage value S42 except when the operation confirmation signal S52 is outputted.

In the preferred embodiment, the microcomputer 45 can outputs at least two signals differing in voltage value from the second terminal 52. Specifically, the microcomputer 45 can output, from the second terminal 52, two kinds of signals, namely a signal of a permissible level having a voltage value lower than the reference voltage value S441 and a signal of an overcurrent-equivalent level having a voltage value higher than the reference voltage value S441.

As conceptually illustrated in FIG. 2, the microcomputer 45 preferably includes a current value detection processing unit 450, a pulse signal generation unit 451, an overcurrent detection processing unit 452, and an operation confirmation processing unit 453. The respective functions of the current value detection processing unit 450, the pulse signal generation unit 451, the overcurrent detection processing unit 452 and the operation confirmation processing unit 453 are realized as the microcomputer 45 executes arithmetic processing according to a predetermined program.

The current value detection processing unit 450 acquires the first voltage value S42 inputted from the current detection unit 42 to the second terminal 52 and detects the value of the bus current Ibus based on the first voltage value S42. The acquisition of the first voltage value S42 is executed in synchronism with the pulse signals S45. The pulse signal generation unit 451 outputs the pulse signals S45 to the inverter unit 3, based on the motor drive command signal (not shown) inputted from the outside and the bus current Ibus detected by the current value detection processing unit 450.

The overcurrent detection processing unit 452 detects a so-called "overcurrent" state, in which the bus current Ibus of the motor 9 becomes an abnormally high value, based on the comparison result of the comparison unit 44. In the preferred embodiment, the overcurrent detection processing unit 452 always monitors the presence or absence of an overcurrent during the time when the below-described operation confirmation processing unit 453 is not operated. Specifically, when the second terminal 52 is set as an input terminal, the overcurrent detection processing unit 452 determines whether the determination voltage S44 of the comparison unit 44 inputted to the first terminal 51 is at an L level or at a H level.

If the determination voltage S44 is at the L level during the detection process, the overcurrent detection processing unit 452 determines that the bus current Ibus of the motor 9 is in an overcurrent state. In that case, the overcurrent detection processing unit 452 stops the output of the pulse signals S45 from the pulse signal generation unit 451, thereby stopping the drive of the motor 9. That is to say, the overcurrent detection processing unit 452 stops the drive of the motor 9 if it is determined that the bus current Ibus of the motor 9 is in an overcurrent state.

On the other hand, if the determination voltage S44 is at the H level during the detection process, the overcurrent detection processing unit 452 determines that the bus current Ibus of the motor 9 falls within a normal range. In that case, the overcurrent detection processing unit 452 does not stop the operation of the pulse signal generation unit 451. Thus, the pulse signal generation unit 451 continues to output the pulse signals S45 to the inverter unit 3.

The operation confirmation processing unit 453 performs a determination process of confirming at a predetermined timing whether the comparison unit 44 is normally operated. Specifically, the microcomputer 45 temporarily invalidates the detection process of the overcurrent detection processing unit 452 at a predetermined timing. The microcomputer 45 outputs the operation confirmation signal S52 from the second terminal 52 and causes the operation confirmation processing unit 453 to perform a determination process.

Figure 3:
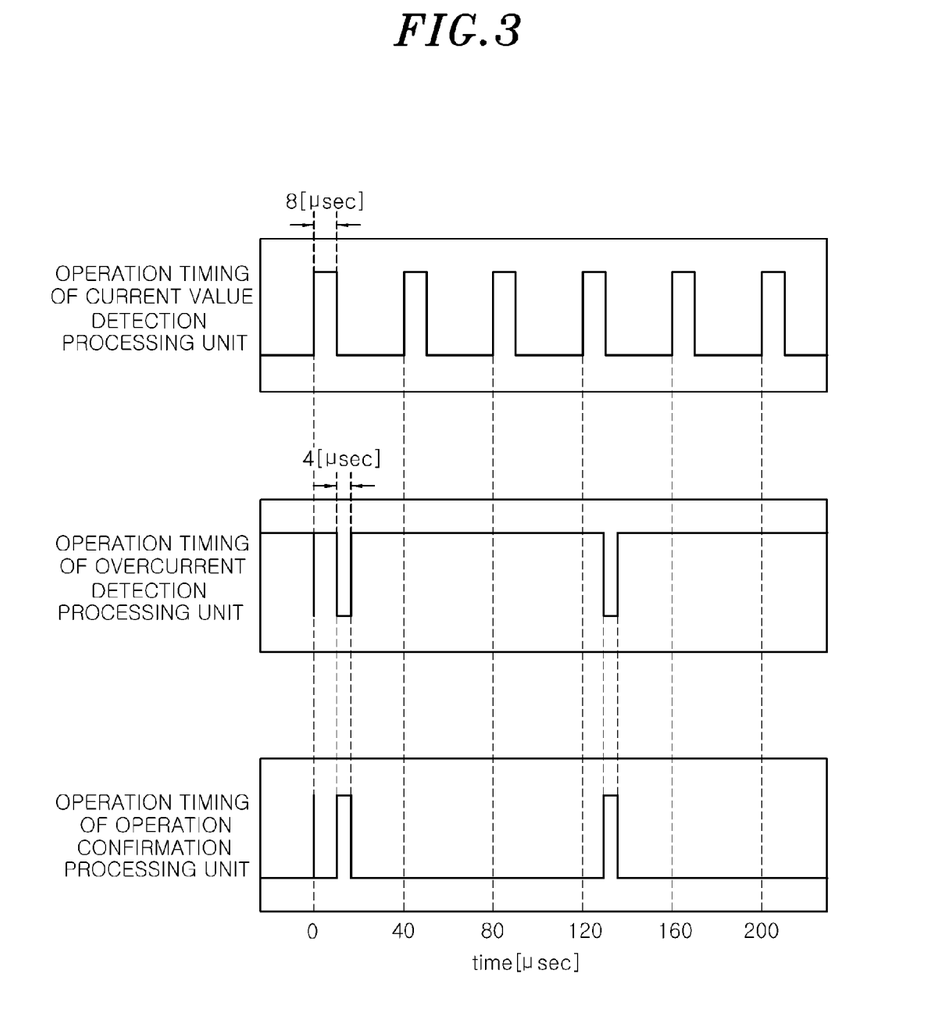
FIG. 3 is a view illustrating operation timings of respective processing units of a microcomputer according to a preferred embodiment.

FIG. 3 is a view illustrating the respective operation timings of the current value detection processing unit 450, the overcurrent detection processing unit 452 and the operation confirmation processing unit 453 in the microcomputer 45. As illustrated in FIG. 3, the current value detection processing unit 450 performs a detection process of the bus current Ibus at predetermined time intervals. In FIG. 3, the period of the detection process of the current value detection processing unit 450 is set at 40 microseconds. The microcomputer 45 causes the operation confirmation processing unit 453 to perform the determination process during the time period in which the detection process is not performed by the current value detection processing unit 450. In the preferred embodiment, the determination process is performed once by the operation confirmation processing unit 453 during the time when the detection process is performed multiple times by the current value detection processing unit 450.

As illustrated in FIG. 3, the overcurrent detection processing unit 452 always performs the overcurrent detection process during the time when the determination process is not performed by the operation confirmation processing unit 453. The microcomputer 45 temporarily stops the detection process performed by the overcurrent detection processing unit 452, during the time when the determination process is performed by the operation confirmation processing unit 453.

2. Operation of Control Circuit

Figure 4:
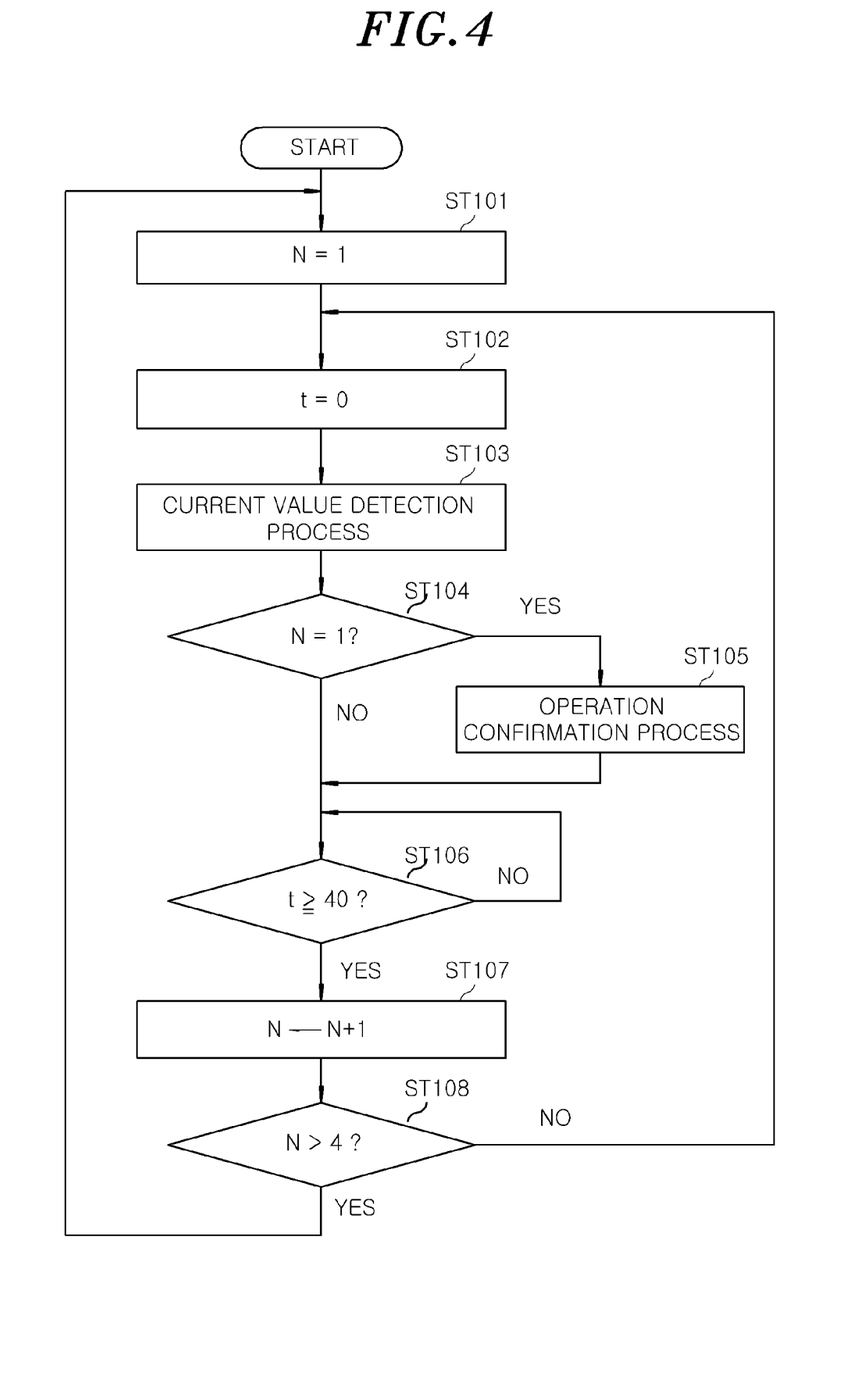
FIG. 4 is a flowchart illustrating the operation of a control circuit when a motor is driven according to a preferred embodiment.
Figure 5:
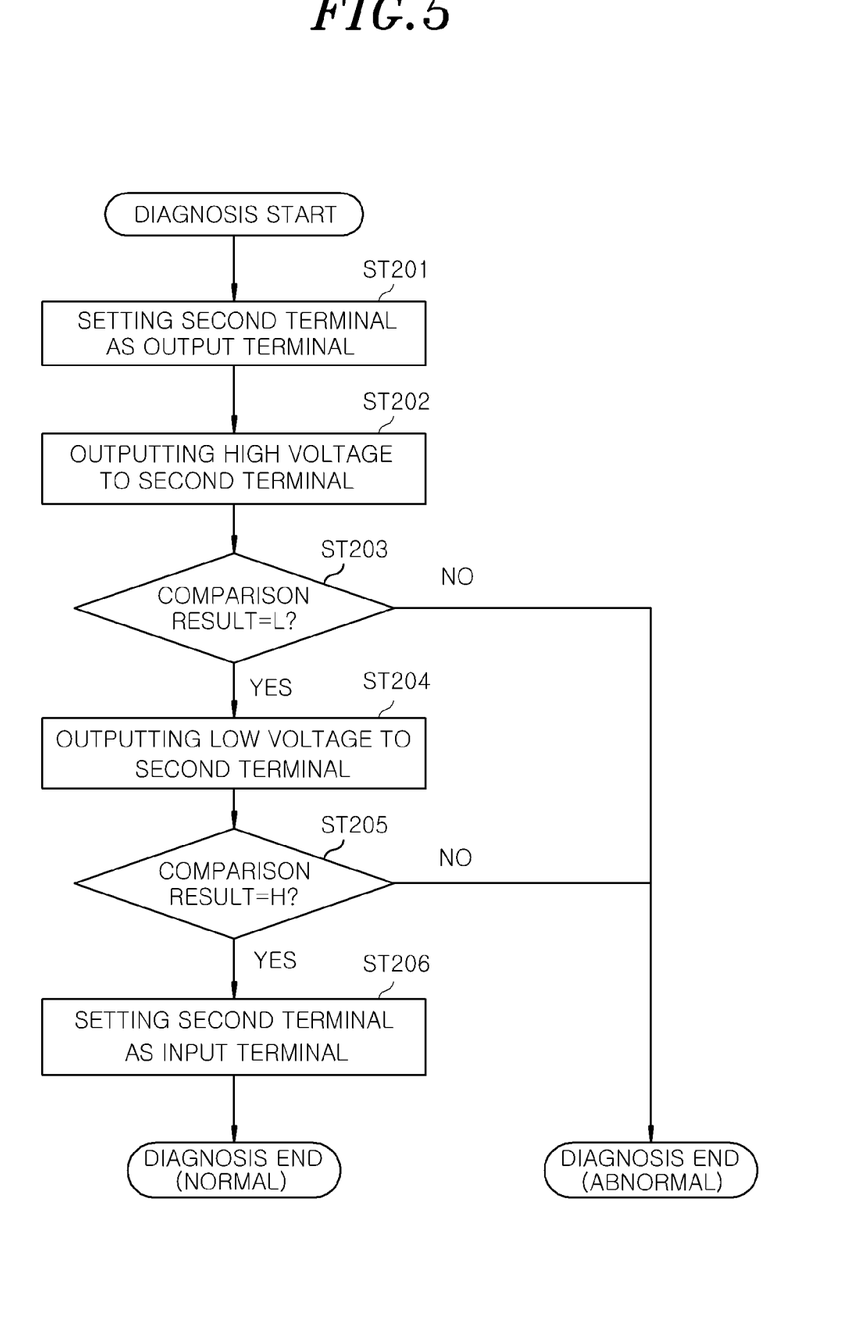
FIG. 5 is a flowchart illustrating the operation of an operation confirmation processing unit during a determination process according to a preferred embodiment.

Next, the operation of the control circuit 4 will be described with reference to FIGS. 4 and 5. FIG. 4 is a flowchart illustrating the operation of the control circuit 4 when the motor 9 is driven. FIG. 5 is a flowchart illustrating the operation of the operation confirmation processing unit 453 during the determination process.

The control circuit 4 determines whether an overcurrent is generated within the motor 9, using the current detection unit 42 and the comparison unit 44, which are electric circuits other than the microcomputer 45, and the microcomputer 45. When the overcurrent state is detected through the electric circuits in this way, if the electric circuits are out of order and if a short-circuit, an earth fault or an open state is generated, there is a possibility that it becomes impossible to detect an overcurrent within the motor 9.

Moreover, the control circuit 4 determines whether a failure is generated in the electric circuits other than the microcomputer 45 of the control circuit 4, by outputting the operation confirmation signal S52 from the second terminal 52 of the microcomputer 45 and performing the determination process using the operation confirmation processing unit 453. Specifically, the current value detection process, the overcurrent detection process and the determination process for the operation confirmation are performed by the control circuit 4 in the following procedure when the motor 9 is driven.

As illustrated in FIG. 4, if the pulse signal generation unit 451 starts to output the pulse signals S45 to the inverter unit 3, the microcomputer 45 initially resets the count number N to 1 (step ST101). Furthermore, time t is reset to 0 (step ST102). The time t is incremented every 1 microsecond.

If the setting of the count number N and the time t is completed. The current value detection processing unit 450 performs the detection process of the bus current Ibus (step ST103). At step ST103, the current value detection processing unit 450 detects the value of the bus current Ibus based on the first voltage value S42 inputted to the second terminal 52. The value of the bus current Ibus thus detected is used to generate the pulse signals S45 in the pulse signal generation unit 451.

In the preferred embodiment, the detection process of the bus current Ibus is completed by about 8 microseconds. After step ST103 is completed, the microcomputer 45 stops the detection process performed by the current value detection processing unit 450.

If the detection process of step ST103 is completed, the microcomputer 45 determines whether the count number N is 1 (step ST104). If it is determined at step ST104 that the count number N is 1, the microcomputer 45 causes the operation confirmation processing unit 453 to perform the determination process (step ST105). The detailed procedure of the determination process will be described later. In the preferred embodiment, the determination process is completed by about 4 microseconds. The microcomputer 45 stops the detection process of the overcurrent detection processing unit 452 during the time when the determination process is performed.

On the other hand, if it is determined at step ST104 that the count number N is not 1, the microcomputer 45 performs step ST106 without performing step ST105.

If the determination process of step ST105 is completed or if it is determined at step ST104 that the count number N is not 1, the microcomputer 45 determines whether the time t is 40 or more (step ST106). That is to say, the microcomputer 45 determines whether 40 microseconds is elapsed from the reset of the time t performed at step ST102. If the time t is less than 40, the microcomputer 45 returns to step ST106 and waits.

If it is determined at step ST106 that the time t is equal to or more than 40, the microcomputer 45 increments the count number N (step ST107). Thereafter, the microcomputer 45 determines whether the count number N is larger than 4 (step ST108).

If it is determined at step ST108 that the count number N is equal to or smaller than 4, the microcomputer 45 returns to step ST102. Then, the microcomputer 45 repeats the processes of steps ST102 to ST107. In this case, if the count number N is 2 to 4, it is determined at step ST104 that the count number N is not 1. Therefore, the determination process of step ST105 is omitted.

On the other hand, if it is determined at step ST108 that the count number N is larger than 4, the microcomputer 45 returns to step ST101 and performs the reset of the count number N.

As described above, in the preferred embodiment, the determination process is performed once by the operation confirmation processing unit 453 during the time when the detection process is performed four times by the current value detection processing unit 450. Alternatively, the determination process may be performed once by the operation confirmation processing unit 453 during the time when the detection process is performed once to three times by the current value detection processing unit 450. Moreover, the determination process may be performed once during the time when the detection process is performed multiple times of five times or more. In order to reduce the load borne by the microcomputer, it is preferred that the frequency of the determination process is reduced as long as the safety can be secured.

Subsequently, the determination process of step ST105 performed by the operation confirmation processing unit 453 will be described with reference to FIG. 5. If a failure is generated in the current detection unit 42 and if a short-circuit, an earth fault or an open state is generated, the first voltage value S42 acquired by the current value detection processing unit 450 remains unchanged. Thus, the microcomputer 45 can recognize an abnormality. However, if a failure is generated in the comparison unit 44, it is difficult for the microcomputer 45 to recognize an abnormality. Thus, in the control circuit 4, the determination process is performed by the operation confirmation processing unit 453 to determine whether a failure is generated in the comparison unit 44.

If the output terminal 442 of the comparison unit 44 undergoes a short-circuit, the voltage inputted to the first terminal 51 becomes equal to or higher than the H level of the determination voltage S44. For that reason, the microcomputer 45 cannot detect an overcurrent state and continues to output the pulse signals S45. On the other hand, if the output terminal 442 of the comparison unit 44 undergoes an earth fault, the voltage inputted to the first terminal 51 becomes equal to or lower than the L level of the determination voltage S44. Thus, the microcomputer 45 determines that an overcurrent state is generated, and stops the output of the pulse signals S45. Furthermore, if the output terminal 442 of the comparison unit 44 is in an open state, the voltage inputted to the first terminal 51 becomes indefinite regardless of the voltage value inputted to the comparison unit input terminal 43. In that case, there is a possibility that the microcomputer 45 cannot properly detect an overcurrent state and may continue to output the pulse signals S45.

In the determination process, the microcomputer 45 initially converts the second terminal 52 from an analog input terminal to a digital output terminal (step ST201). Then, the operation confirmation processing unit 453 causes the second terminal 52 to output an operation confirmation signal S52 of an overcurrent-equivalent level having a voltage value higher than the reference voltage value S441 (step ST202). When the operation confirmation signal S52 of an overcurrent-equivalent level is inputted to the comparison unit input terminal 43, if the comparison unit 44 has no abnormality, the determination voltage S44 outputted from the comparison unit 44 becomes an L level. The operation confirmation processing unit 453 determines whether the determination voltage S44 outputted from the comparison unit 44 is changed to an L level (step ST203).

If the determination voltage S44 outputted from the comparison unit 44 is not changed to an L level at step ST203, it is highly likely that a short-circuit is generated in the comparison unit 44 or that the comparison unit 44 is in an open state. Thus, the operation confirmation processing unit 453 determines that the comparison unit 44 is in an abnormal state, and terminates the determination process. Then, the operation confirmation processing unit 453 stops to output the pulse signals S45 from the pulse signal generation unit 451 to the inverter unit 3.

On the other hand, if the determination voltage S44 outputted from the comparison unit 44 is changed to an L level at step ST203, the operation confirmation processing unit 453 causes the second terminal 52 to output an operation confirmation signal S52 of a permissible level having a voltage value lower than the reference voltage value S441 (step ST204). When the operation confirmation signal S52 of a permissible level is inputted to the comparison unit input terminal 43, if the comparison unit 44 has no abnormality, the determination voltage S44 outputted from the comparison unit 44 becomes a H level. The operation confirmation processing unit 453 determines whether the determination voltage S44 outputted from the comparison unit 44 is changed to a H level (step ST205).

If the determination voltage S44 outputted from the comparison unit 44 is not changed to a H level at step ST205, it is highly likely that an earth fault is generated in the comparison unit 44 or that the comparison unit 44 is in an open state. Thus, the operation confirmation processing unit 453 determines that the comparison unit 44 is in an abnormal state, and terminates the determination process. Then, the operation confirmation processing unit 453 stops to output the pulse signals S45 from the pulse signal generation unit 451 to the inverter unit 3.

On the other hand, if the determination voltage S44 outputted from the comparison unit 44 is changed to a H level at step ST205, the microcomputer 45 converts the setting of the second terminal 52 from an output terminal to an input terminal (step ST206). The microcomputer 45 determines that the comparison unit 44 is in a normal state, and terminates the determination process.

In this way the drive control device 1 can perform the operation confirmation as to whether the comparison unit 44 for detecting an overcurrent is normally operated. In the drive control device 1, the same terminal of the microcomputer 45 is used in inputting the first voltage value S42 from the current detection unit 42 and outputting the operation confirmation signal S52. This makes it possible to reduce the number of used terminals of the microcomputer 45.

Particularly, in the preferred embodiment, the drive control device 1 causes the operation confirmation processing unit 453 to perform the determination process while stopping the detection process of the overcurrent detection processing unit 452. Thus, there is no possibility that the drive of the brushless DC motor 9 is erroneously stopped by the high voltage signal outputted from the second terminal 52 during the determination process.

Furthermore, in the preferred embodiment, the drive control device 1 causes the current value detection processing unit 450 to perform the detection process at predetermined time intervals. The operation confirmation processing unit 453 performs the determination process using the time between the predetermined time intervals. Thus, it is possible to confirm the operation of the comparison unit 44 without reducing the operation frequency of the current value detection processing unit 450.

As illustrated in FIG. 2, in the preferred embodiment, the operational amplifier OP1 as an amplifier and the operational amplifier OP2 included in the comparison unit are serially connected to each other. By doing so, as compared with a case where the two operational amplifiers OP1 and OP2 are connected in parallel, it is possible to simplify the circuit configuration.

3. Modification

While one exemplary preferred embodiment of the present disclosure has been described above, the present disclosure is not limited to the above-described embodiment.

In the aforementioned embodiment, the second terminal always receives the input of the first voltage value S42 except when the operation confirmation signal S52 is outputted. Alternatively, the second terminal 52 may not perform the input and the output during a period except the period in which the operation confirmation signal S52 is outputted from the second terminal 52 and the period in which the first voltage value S42 is inputted to the second terminal 52.

The second terminal 52 may continuously and sequentially output the operation confirmation signal S52 of an overcurrent-equivalent level and the operation confirmation signal S52 of a permissible level. Furthermore, the second terminal 52 may intermittently and sequentially output the operation confirmation signal S52 of an overcurrent-equivalent level and the operation confirmation signal S52 of a permissible level.

The detailed configuration of the drive control device may differ from the circuit configuration illustrated in FIGS. 1 and 2. Furthermore, the time required in the overcurrent detection process and the operation confirmation may differ from the time of the aforementioned embodiment.

The drive control device of the present disclosure can be used in, for example, a drive control device of a brushless DC motor.

Features of the above-described preferred embodiment and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive control device of a brushless DC motor, comprising:
    a control circuit including a comparison unit configured to compare a first voltage value, which increases or decreases depending on a current value obtained in an inverter unit for driving the brushless DC motor, with a reference voltage value, and an arithmetic processing unit configured to determine presence or absence of an overcurrent based on a comparison result of the comparison unit,
    wherein the arithmetic processing unit includes:
    a first terminal to which the comparison result of the comparison unit is inputted,
    an overcurrent detection processing unit configured to determine an overcurrent state and stop the drive of the brushless DC motor if the first voltage value exceeds the reference voltage value in the comparison result,
    a second terminal configured to receive the input of the first voltage value and repeatedly output an operation confirmation signal to the comparison unit at predetermined timings, and
    an operation confirmation processing unit configured to determine a state of the first terminal based on an output timing of the operation confirmation signal.

2. The device according to claim 1, wherein the second terminal is configured to receive the input of the first voltage value except when the operation confirmation signal is outputted.

3. The device according to claim 1, wherein the second terminal is configured to sequentially output at least two signals differing in voltage value to the comparison unit when outputting the operation confirmation signal.

4. The device according to claim 1, wherein the arithmetic processing unit is configured to stop processing of the overcurrent detection processing unit and perform processing of the operation confirmation processing unit when the operation confirmation signal is outputted from the second terminal.

5. The device according to claim 4, wherein the arithmetic processing unit further includes a current value detection processing unit configured to repeatedly perform a process of detecting the current value, at predetermined time intervals, based on the first voltage value, and during a period in which a detection process is not performed by the current value detection processing unit, the operation confirmation signal is outputted from the second terminal and a determination process is performed by the operation confirmation processing unit.

6. The device according to claim 5, wherein the arithmetic processing unit is configured such that the determination process is performed once by the operation confirmation processing unit while the detection process is performed multiple times by the current value detection processing unit.

7. The device according to claim 1, wherein the control circuit further includes an amplifier configured to convert the current value obtained in the inverter unit to the first voltage value, and the amplifier and the comparison unit are serially connected to each other.

* * * * *